Figure 1:
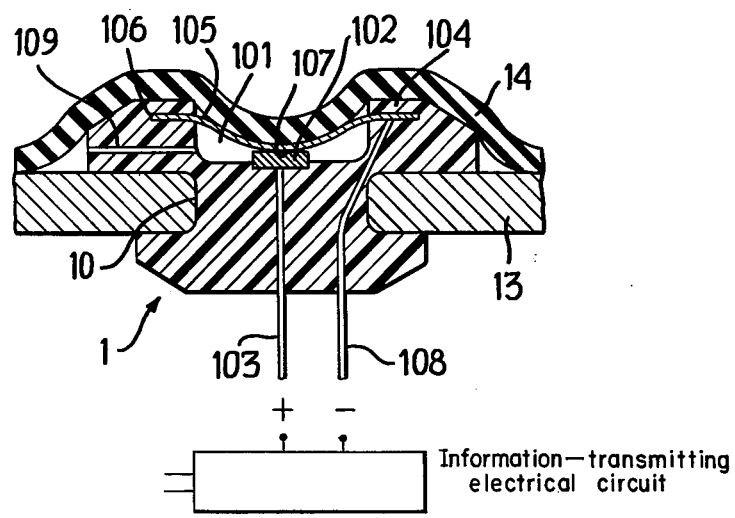

United States Patent [19]

Lejeune

[11] 4,071,724

[45] Jan. 31, 1978

[54] TIRE PRESSURE VARIATION DETECTOR

[75] Inventor: Daniel Lejeune, Clermont-Ferrand, France

[73] Assignee: Compagnie Generale des Etablissements Michelin, France

[21] Appl. No.: 678,617

[22] Filed: Apr. 20, 1976

[30] Foreign Application Priority Data

Apr. 21, 1975 France .................................. 75 12433

[51] Int. Cl.² .......................... B60C 23/04; H01H 35/24
[52] U.S. Cl. ................................ 200/61.25; 116/34 B; 340/58
[58] Field of Search ............ 340/58; 200/61.22, 61.25, 200/61.26; 116/34 R, 34 B

[56] References Cited

U.S. PATENT DOCUMENTS

| | | | |
|---|---|---|---|
| 2,113,957 | 4/1938 | Androsky | 340/58 |
| 2,174,464 | 9/1939 | Givens | 340/58 |
| 2,313,247 | 3/1943 | Krow | 200/61.26 |
| 2,447,689 | 8/1948 | Dysart | 340/58 |
| 2,520,241 | 8/1950 | Geraci et al. | 340/58 |
| 2,560,276 | 7/1951 | Colgan, Jr. | 200/61.26 |
| 2,649,518 | 8/1953 | Fuehring | 340/58 |
| 2,725,434 | 11/1955 | Brodsky | 200/61.26 |
| 2,797,273 | 6/1957 | Brodsky | 200/61.26 |
| 3,281,784 | 10/1966 | Farthing | 340/58 |

FOREIGN PATENT DOCUMENTS 670,829  12/1929  France .......................... 200/61.26

Primary Examiner—John W. Caldwell, Sr.
Assistant Examiner—Joseph E. Nowicki
Attorney, Agent, or Firm—Brumbaugh, Graves, Donohue & Raymond

[57] ABSTRACT

A tire pressure variation detector is fixed in the wall of the wheel rim and is adapted to signal whether the inner tube of the tire is inflated to the normal air pressure and also to signal whether the space outside the inner tube contains air under pressure which has escaped from the inner tube.

5 Claims; 4 Drawing Figures

Information—transmitting electrical circuit

Information—transmitting electrical circuit

TIRE PRESSURE VARIATION DETECTOR

The present invention relates to improvements in pressure variation detectors adapted to be installed on a unit formed of a wheel rim, a pneumatic tire and its inner tube.

When a pointed object perforates the wall of a tire so as also to break the airtightness of the inner tube, the air pressure filling the inner tube decreases, as is known, and this decrease in air pressure is harmful to the life and performance of the tire. It is also known that the air which is lost by the inner tube spreads out between the inside wall of the tire and the outside wall of the inner tube, finally escaping into the open air. When a wheel rim formed by a single airtight element or an assembly of airtight elements is used on which the beads of the tire are wedged, the only place where the air lost by the inner tube can escape consists of the free annular space in the wheel rim between the wall of the passage hole for the stem of the inflation valve of the inner tube and said stem itself.

It is already known to make this annular space between the wall of the passage hole and the stem of the inflation valve impervious to air, so as to delay the loss of air pressure within the tire and the consequences thereof. As a matter of fact, the air pressure contained in an inner tube which has a leak and the air pressure which has been established in the space formed by the inside wall of the tire, the outside wall of the inner tube and the wall of the wheel rim extending between the two beads of the tire (referred to hereinafter as "the space outside the inner tube") balance each other out and the tire behaves as though there were no flat.

However, such an arrangement is only apparently free of drawbacks due to the fact that the driver of the vehicle is unaware of the fact that a pointed object has perforated the wall of the tire and that the airtightness of the space outside the inner tube which is assured by means of this arrangement is not equivalent to that of an inner tube capable of retaining the inflation pressure constant for several months.

Stated differently, this arrangement is merely a temporary remedy intended to slow down the leakage of air for a reasonable period of time so as to permit the vehicle to arrive at its destination.

It is also known to use a device which detects the variation of the pressure of the air contained in the inner tube, said detector device being fastened to the wheel rim. Such a detector device comprises an elastic element adapted to be deformed by the inner tube by resting against the outside wall of the inner tube. This elastic element bears a movable metallic contact which is electrically insulated from a stationary metallic contact which is connected with the body of the detector. The movable metallic contact touches the stationary metallic contact when the inner tube is inflated to its normal air pressure but moves away from the stationary metallic contact when the pressure of the air in the inner tube is less than the normal air pressure. The stationary metallic contact and the movable metallic contact are connected to the terminals of an information-transmitting electrical circuit of which they constitute the on-off element. However, such a detector is incapable of signalling a variation in air pressure in the space outside the inner tube, as defined above.

Thus the object of the present invention is to create a detector which is fixed in the wall of the wheel rim and adapted to signal whether the inner tube of the tire is inflated to the normal air pressure and also to signal whether the space outside the inner tube contains air under pressure which has escaped from the inner tube.

Therefore, the pressure variation detector in accordance with the present invention comprises a body adapted to be fastened in an opening provided in the wall of a wheel rim for a pneumatic tire. This body is provided with an elastic element on the portion of the detector intended to enter into contact with the inner tube. The elastic element bears a movable electrical contact and the body bears a stationary electrical contact. These two contacts are, on the one hand, electrically insulated from each other while, on the other hand, each of them is connected to a separate terminal of an information-transmitting electrical circuit of which they constitute the on-off element. Furthermore, the stiffness of the elastic element is such that the two electrical contacts touch each other when the inner tube is inflated to the normal air pressure stipulated for the tire but move away from each other when the air pressure in the space outside the inner tube increases due to a leak in the inner tube.

The detector device is characterized by the fact that the body of the device is fastened in airtight manner in the opening of the wall of the wheel rim, and that this body comprises, in the portion thereof intended to enter into contact with the inner tube, a cavity which contains the stationary electrical contact and which is closed by a flexible airtight diaphragm which serves as the elastic element, this cavity being connected to the space outside the inner tube by a channel provided in the body of the detector. Such a detector is sensitive to the combined action of a drop of air pressure in the inner tube and an increase of air pressure in the space outside the inner tube, in case of a flat.

The diaphragm may be made of a metal or a metal-bearing elastomer. The body of the device may advantageously be made of a moldable material which is electrically insulating and sufficiently flexible to assure the airtightness of the fastening of the detector in the opening of the wall of the wheel rim.

It goes without saying that the space outside the inner tube is made airtight by some suitable means. As to the elastic element of the detector in accordance with the invention, it may be of any structure provided that it is adapted to satisfy the functions which are assigned to it in the foregoing definition of the invention and its variants.

The figures of the accompanying drawing, a description of which follows, are intended to show one illustrative but nonlimitative example of the invention.

Figure 2:
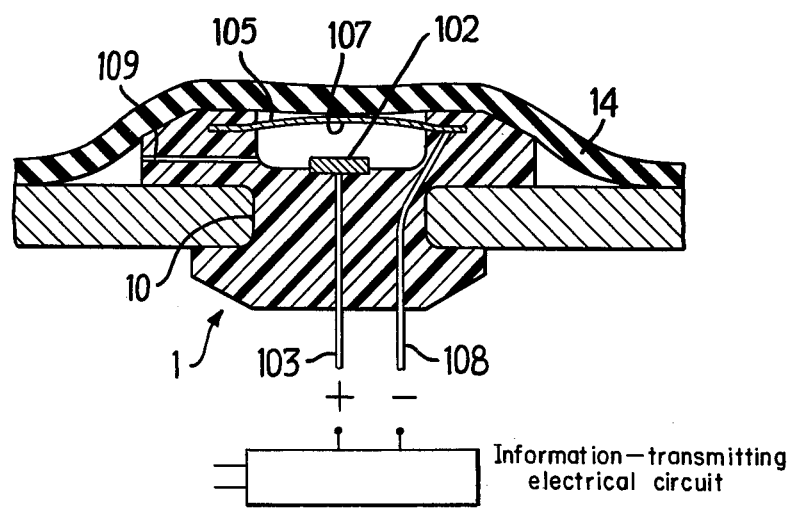
Figure 3:
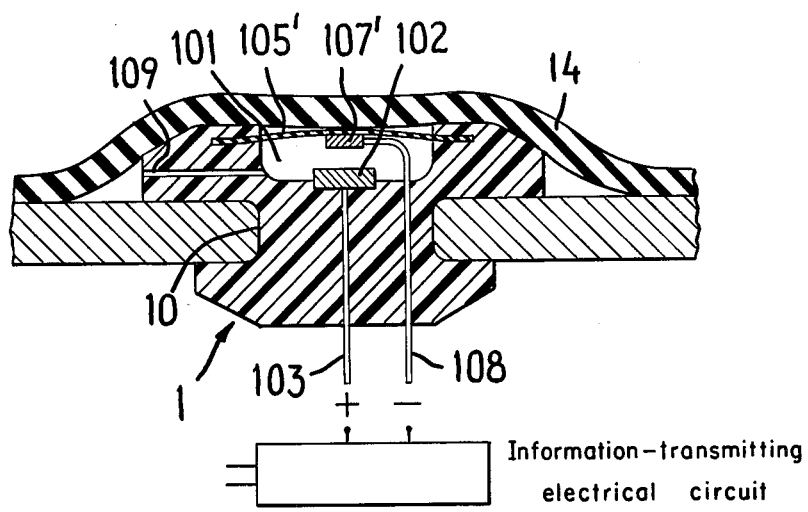
Figure 4:
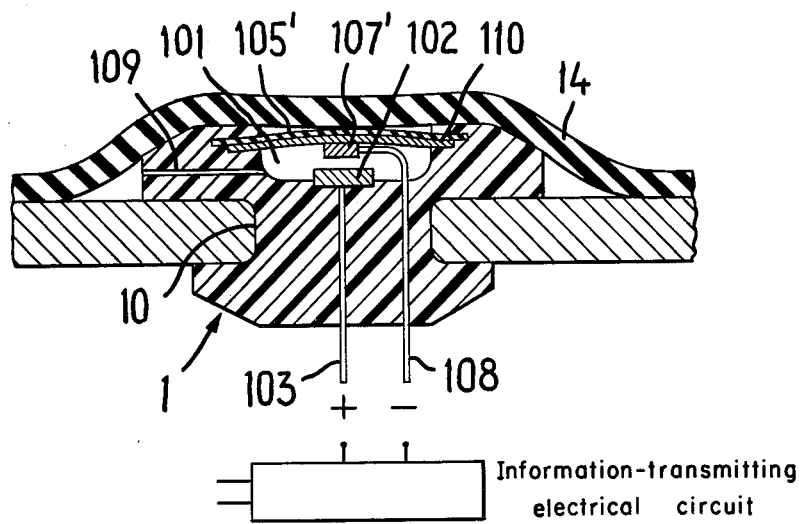

FIG. 1 shows, in axial section, a detector in accordance with the invention when the inner tube is at its normal air pressure, FIG. 2 shows the same detector when there has been a decrease of air pressure in the inner tube and an increase of air pressure in the space outside the inner tube, and FIGS. 3 and 4 show, in axial section, two variants of the detector in accordance with the invention when there has been a decrease of air pressure in the inner tube and an increase of air pressure in the space outside the inner tube.

FIG. 1 shows the body 1 of a detector in accordance with the invention. This body 1 consists of insulating material and is provided with a groove 10 by means of which the detector is fastened in airtight manner in an opening provided in the wall of a wheel rim 13 (partially shown). On the side facing the inner tube 14 (partially shown), the body 1 has a cavity 101 on the bottom of which there is fastened a stationary electrical contact 102 which is extended towards the outside of the rim 13 by a conductor 103 intended to connect this contact to the information-transmitting electrical circuit.

In the periphery 104 around the cavity 101 there is embedded in airtight manner an elastic metallic diaphraghm 105. This diaphragm itself forms the movable electrical contact 107 of the detector device. Therefore, the edge 106 of the diaphragm 105 is connected by a conductor 108 to the information-transmitting electrical circuit. The periphery 104 of the body 1 comprises, on the side where it is in contact with the space (not shown) outside the inner tube 14, a channel 109 which places the space outside the inner tube in communication with the cavity 101 which is closed by the diaphragm 105.

As shown in FIG. 2, the movable electrical contact 107 has moved away from the stationary electrical contact 102. Since the inner tube has suffered a decrease in air pressure as compared with the space outside the inner tube 14, the diaphragm 105 has straightened itself again. In FIG. 1, on the other hand, the moveable electrical contact 107, that is to say the central portion of the diaphragm 105, touches the stationary electrical contact 102, since the air pressure prevailing within the inner tube is normal.

In a variant shown in FIG. 3, the metallic diaphragm 105 shown in FIG. 1 and 2 can be replaced by a flexible diaphragm 105', for instance of elastomer, to which the movable electrical contact 107' is fastened. If necessary and as shown in FIG. 4, suitable stiffness of such an elastomeric diaphragm 105' can be obtained by means of a flexible blade or a coil spring 110 bearing the movable electrical contact 107' arranged between the flexible elastomeric diaphragm 105' and the bottom of the cavity 101. In a further equivalent variant (not shown) the conductor 108, rather than being connected to the metallic diaphragm 105, is instead connected to a second stationary electrical contact on the bottom of the cavity 101. The metallic diaphragm 105 then serves as a movable electrical bridge between the two stationary electrical contacts.

The information-transmitting electrical circuit may be any desired one, but it must satisfy two conditions. It must be capable of being activated and/or deactivated by the opening and/or closing of the stationary and movable electrical contacts of a detector in accordance with the invention. Furthermore, it must be capable of transmitting the information corresponding to the normal air pressure or to a decrease in air pressure of the rotating wheel to a receiver arranged on a part of the vehicle which is fixed with respect to the above-mentioned rotating assembly. A detector of the type corresponding to FIGS. 1 and 2 has been used to detect decreases in air pressure in a tire of size 175-14 whose inner tube was inflated to 1.8 bar. The diaphragm had an elasticity of 0.7 daN/mm. The moving apart of the movable electrical contact and stationary electrical contact took place when the air pressure in the inner tube had dropped to 1.1 bar.

In the event that it were desired to use the detector of the invention combined with a tubeless tire, it would then be sufficient not to provide the channel 109 or else to plug said channel and to provide in the body 1 a channel which connects the cavity 101 to the atmosphere.

What is claimed is:

1. A tire pressure variation detector connected to an information-transmitting electrical circuit by on-off elements, said detector comprising a body adapted to be fastened in an opening of a wall of an airtight wheel rim for a pneumatic tire having two beads and an inside wall and containing an inner tube having an outside wall, said wall of the wheel rim extending between the two beads of the tire, said body comprising a portion intended to enter into contact with the inner tube and having a stiff elastic element bearing a movable electrical contact intended to enter into contact with a stationary electrical contact borne by another portion of said body, the two electrical contacts being electrically insulated from each other and constituting said on-off elements of said information-transmitting electrical circuit, the stiffness of the elastic element being such that the two electrical contacts touch each other when the inner tube is inflated to normal inflation air pressure and move away from each other when air pressure increases in a space outside the inner tube, said space outside the inner tube being formed by the inside wall of the tire, the outside wall of the inner tube and said wall of the wheel rim, the detector being characterized by the fact that the body is fastened in airtight manner in the opening of the wall of the wheel rim and comprises, in the portion thereof intended to enter into contact with the inner tube, a cavity which contains the stationary electrical contact and which is closed by a flexible airtight diaphragm which serves as the elastic element, said cavity being connected to said space outside the inner tube by a channel provided in the body of the detector.

2. The detector according to claim 1, characterized by the fact that the flexible airtight diaphragm is of metal, that it constitutes the elastic element of the detector, and that it forms the movable electrical contact.

3. The detector according to claim 1, characterized by the fact that the flexible airtight diaphragm consists of an elastomer to which the movable electrical contact is fastened.

4. The detector according to claim 3, characterized by the fact that a flexible spring bearing the movable electrical contact is arranged between the flexible elastomeric diaphragm and the bottom of the cavity.

5. The detector according to claim 1, characterized by the fact that the body of the detector consists of an elestrically insulating moldable material which is sufficiently flexible to assure the airtightness of the fastening of the detector in the opening of the wall of the wheel rim.

* * * * *